United States Patent
Grass et al.

(10) Patent No.: US 11,506,529 B2
(45) Date of Patent: Nov. 22, 2022

(54) APPARATUS FOR DETERMINING A LEVEL AND/OR QUALITY OF A FLUID IN A FLUID CONTAINER

(71) Applicant: Vitesco Technologies GmbH, Hannover (DE)

(72) Inventors: Philippe Grass, Munich (DE); Stephan Heinrich, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 5 days.

(21) Appl. No.: 16/969,494

(22) PCT Filed: Jan. 28, 2019

(86) PCT No.: PCT/EP2019/051938
§ 371 (c)(1),
(2) Date: Aug. 12, 2020

(87) PCT Pub. No.: WO2019/158345
PCT Pub. Date: Aug. 22, 2019

(65) Prior Publication Data
US 2020/0400481 A1    Dec. 24, 2020

(30) Foreign Application Priority Data

Feb. 13, 2018    (DE) .................... 10 2018 202 209.7

(51) Int. Cl.
*G01F 23/296* (2022.01)
*G01F 23/2962* (2022.01)
*G01N 9/24* (2006.01)

(52) U.S. Cl.
CPC ...... *G01F 23/2968* (2013.01); *G01F 23/2962* (2013.01); *G01N 9/24* (2013.01)

(58) Field of Classification Search
CPC .... G01F 23/2968; G01F 23/2962; G01N 9/24
(Continued)

(56) References Cited

U.S. PATENT DOCUMENTS

| 3,419,845 A | 12/1968 | Thiede et al. ............. 367/105 |
| 4,656,384 A | 4/1987 | Magori ........................ 310/334 |

(Continued)

FOREIGN PATENT DOCUMENTS

| CN | 101636666 A | 1/2010 | ............. G01S 15/08 |
| CN | 104204436 A | 12/2014 | ............... F01N 3/20 |

(Continued)

OTHER PUBLICATIONS

Search Report for International Application No. PCT/EP2019/051938, 13 pages, dated May 17, 2019.
(Continued)

*Primary Examiner* — Robert R Raevis
(74) *Attorney, Agent, or Firm* — Slayden Grubert Beard PLLC

(57) ABSTRACT

Various embodiments include determining a level of a surface of a fluid and/or for determining a quality of the fluid in a fluid container. An example apparatus comprises a sound transducer module having two sound transducers designed to receive and emit sound signals in such a manner that a superimposition sound signal results when the sound signals are superimposed, and a reference element arranged in the fluid at a predefined distance from the sound transducer module and is designed to reflect the superimposition sound signal. The sound transducer module is designed, by superimposing the at least two sound signals, to emit the superimposition sound signal both in a first direction to the surface of the fluid and in a second direction to the reference element, said second direction running at a predetermined sound signal angle with respect to the first direction.

8 Claims, 1 Drawing Sheet

(58) Field of Classification Search
USPC .................. 73/290 v, 32 a, 61.43, 61.61
See application file for complete search history.

(56) References Cited

U.S. PATENT DOCUMENTS

| | | | |
|---|---|---|---|
| 5,065,624 A | 11/1991 | Fell ........................ 73/290 V |
| 5,337,289 A | 8/1994 | Fasching ................. 367/140 |
| 5,744,898 A | 4/1998 | Smith ...................... 310/334 |
| 6,427,532 B1 | 8/2002 | Keller ..................... 73/290 V |
| 6,581,459 B1 | 6/2003 | Lichtenfels ............. 73/290 V |
| 9,038,442 B2 | 5/2015 | Reimer ..................... 73/61.61 |
| 9,322,773 B2 | 4/2016 | Coates |
| 9,488,514 B2 | 11/2016 | Murphy |
| 9,556,774 B2 | 1/2017 | Hodgson et al. |
| 9,691,114 B2 | 6/2017 | Ashrafzadeh |
| 9,766,193 B2 | 9/2017 | Liu ........................ G01N 25/00 |
| 9,885,597 B2 | 2/2018 | Stangl et al. |
| 10,234,322 B2 | 3/2019 | Stangl et al. |
| 2004/0182149 A1* | 9/2004 | Balin ................... G01F 23/2962 73/290 V |
| 2010/0018309 A1 | 1/2010 | Marcovecchio et al. ... 73/290 V |
| 2015/0000396 A1 | 1/2015 | Maguin .................... 73/290 V |
| 2015/0323373 A1 | 11/2015 | Maguin .................... 73/290 V |
| 2015/0354429 A1 | 12/2015 | Thompson ..................... 137/4 |
| 2016/0115838 A1 | 4/2016 | Girardi ........................ 701/102 |
| 2016/0123929 A1 | 5/2016 | De ................................. 73/632 |
| 2017/0082479 A1 | 3/2017 | Pfeiffer ................. G01F 23/296 |
| 2017/0089751 A1* | 3/2017 | Pfeiffer ............... G01F 23/2968 |
| 2017/0122789 A1 | 5/2017 | Borsoi ..................... 73/290 V |
| 2017/0184438 A1 | 6/2017 | Borsoi ..................... 73/290 V |
| 2017/0205338 A1 | 7/2017 | Coates .................. G01N 21/31 |

FOREIGN PATENT DOCUMENTS

| | | | |
|---|---|---|---|
| CN | 105556258 A | 5/2016 | ........... G01F 23/296 |
| CN | 105556259 A | 5/2016 | ........... G01F 23/296 |
| DE | 40 25 326 | 5/1990 | ........... G01F 23/28 |
| DE | 6 95 27 566 | 4/1994 | ........... G01F 23/296 |
| DE | 10 2014 210 077 | 5/2014 | ........... G01F 23/296 |
| DE | 10 2014 210 080 | 5/2014 | ........... G01F 23/296 |
| JP | H11-218 436 | 1/1998 | ............ G01F 23/28 |
| WO | 98 04889 | 2/1998 | ............ G01F 23/296 |
| WO | 2008 107336 | 3/2007 | ............. G01N 21/43 |
| WO | 2012/123344 A1 | 9/2012 | ........... G01F 23/296 |
| WO | 2017 077002 | 11/2015 | ............. F01N 11/00 |

OTHER PUBLICATIONS

Office Action for DE Patent Application No. 10 2018 202 209.7, 5 pages, dated Nov. 20, 2018.
"Transmitting Ultrasound Pules—Wikisonix," 7 pages, dated Nov. 17, 2017.
Matthias Rutsch, "Extending the Receive Performance of Phased Ultrasonic Transducer Arrays in Air Down to 40 kHz and Below," IEEE International Ultrasonics Symposium Proceedings, 4 pages.
Chinese Office Action, Application No. 201980013195.4, 23 pages, dated Nov. 3, 2021.

* cited by examiner

APPARATUS FOR DETERMINING A LEVEL AND/OR QUALITY OF A FLUID IN A FLUID CONTAINER

CROSS-REFERENCE TO RELATED APPLICATIONS

This application is a U.S. National Stage Application of International Application No. PCT/EP2019/051938 filed Jan. 28, 2019, which designates the United States of America, and claims priority to DE Application No. 10 2018 202 209.7 filed Feb. 13, 2018, the contents of which are hereby incorporated by reference in their entirety.

TECHNICAL FIELD

The present disclosure relates to fluid containers. Various embodiments may include apparatuses and/or methods for determining a level and/or quality of a fluid, for example a urea solution, in a fluid container of a vehicle.

BACKGROUND

An acoustic measuring apparatus can be used to determine a level of a fluid surface in a fluid container. A sound transducer of the acoustic measuring apparatus can operate both as a sound generator and as a sound receiver. In order to determine the level of the fluid surface in the fluid container, the sound transducer can emit sound pulses into the fluid to be measured. The sound pulses can be reflected by a boundary surface of the fluid with respect to a further medium. Conclusions on the level of the fluid surface in the fluid container can be drawn from the propagation time of the sound pulses.

Furthermore, a separately provided sound transducer can be used to emit sound signals in the direction of a reference reflector arranged in the fluid in order to determine a sound speed in the fluid. The sound speed can be used in this case both to determine the fluid surface and to determine the quality of the fluid. For example, DE 10 2014 210 080 A1 describes an apparatus for determining a level of a fluid surface in a fluid container. The apparatus described therein has a first sound transducer which is designed to emit sound signals in the direction of the fluid surface and to receive the signals reflected at the fluid surface, and a second sound transducer which is designed to emit sound signals in the direction of a reference element arranged in the fluid container and to receive the signals reflected at the reference element. A sound speed inside the fluid can be determined from the sound signals emitted and received again by the second sound transducer, which sound speed can in turn be used to determine the level of the fluid surface.

DE 10 2014 210 077 A1 also describes an apparatus and a method for determining the level of a fluid surface in a fluid container. In addition, U.S. Pat. No. 5,744,898 A discloses an apparatus having an ultrasonic transducer matrix having an integrated transceiver circuit.

SUMMARY

The present disclosure is describes apparatuses for determining a level and/or a quality of a fluid in a fluid container, which apparatus makes it possible to reliably determine the level and/or quality of the fluid and, at the same time, can be produced in a cost-effective and efficient manner. As an example, some embodiments include a apparatus for determining a level (H) of a surface (O) of a fluid (F) and/or for determining a quality of the fluid (F) in a fluid container (F), wherein the apparatus has: a sound transducer module (10) having at least two sound transducers (20-90) which are each designed to receive and emit sound signals in such a manner that a superimposition sound signal (11, 12, 13, 14, 18) results when the at least two sound signals are superimposed, and a reference element (8) which is arranged in the fluid (F), is at a predefined distance from the sound transducer module (10) and is designed to reflect the superimposition sound signal (11, 12, 13, 14, 18), wherein the sound transducer module (10) is designed, by superimposing the at least two sound signals, to emit the superimposition sound signal (11, 12, 13, 14, 18) both in a first direction to the surface (O) of the fluid (F) and in a second direction to the reference element (8), said second direction running at a predetermined sound signal angle with respect to the first direction.

In some embodiments, the sound transducer module (10) is also designed to be controlled in at least two different control modes in such a manner that, in a first control mode, the superimposition sound signal (11, 12, 13, 14, 18) is emitted in the first direction to the surface (O) of the fluid (F) and, in a second control mode, the superimposition sound signal (11, 12, 13, 14, 18) is emitted in the second direction to the reference element (8).

In some embodiments, the different control modes differ in terms of the control of the at least two sound transducers (20-90) with regard to the amplitude, the frequency and/or the phase offset between the at least two sound signals.

In some embodiments, the predetermined sound signal angle between the first direction and the second direction is in a range between approximately 70° and approximately 110°, in a range between approximately 80° and approximately 100°, in a range between approximately 85° and approximately 95°, and/or approximately 90°.

In some embodiments, the at least two sound transducers (20-90) are arranged in a common plane (E) in the form of a matrix, wherein the plane (E) is inclined by a predetermined tilt angle ($\alpha$) relative to the surface (O) of the fluid, which tilt angle is in a range between approximately 25° and approximately 65°, in a range between approximately 35° and approximately 55°, in a range between approximately 40° and approximately 50°, and/or approximately 45°.

In some embodiments, the at least two sound transducers (20-90) are arranged at a predetermined distance from one another which is approximately an odd integer multiple of half the wavelength of the sound signals emitted by the at least two sound transducers (20-90).

In some embodiments, there is a control unit (2) which is designed to determine a sound speed inside the fluid (F) on the basis of the superimposition sound signal (11, 12, 13, 14, 18) emitted to the reference element (8) and to determine the level (O) of the fluid surface (O) above a base section (3) of the fluid container (1) and/or the quality of the fluid (F) on the basis of the superimposition sound signal (11, 12, 13, 14, 18) emitted to the fluid surface (O) and the determined sound speed inside the fluid (F).

In some embodiments, the at least two sound transducers (20-90) are capacitive micromechanical ultrasonic transducers (CMUT) or piezoelectric micromechanical ultrasonic transducers (PMUT).

BRIEF DESCRIPTION OF THE DRAWINGS

Further features and objects of the present disclosure are apparent to a person skilled in the art by putting the present teaching into practice and taking into consideration the accompanying drawings, in which.

DETAILED DESCRIPTION

Figure 1:
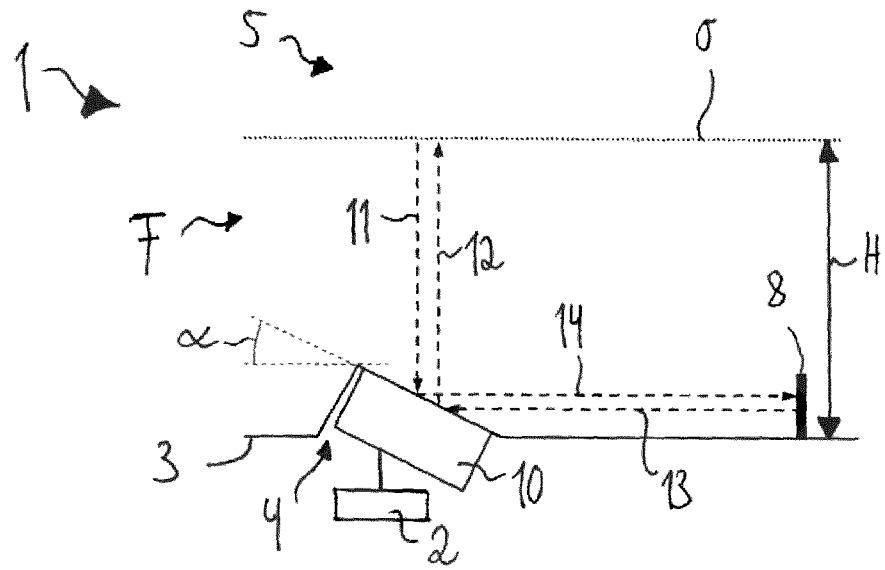
FIG. 1 shows a schematic view of an apparatus incorporating teachings of the present disclosure for determining a level and/or quality of a fluid in a fluid container.

The teachings of the present disclosure include using a sound transducer module having a plurality of sound transducers in an apparatus for determining the level and/or quality of a fluid in a vehicle, in which sound transducer module the superimposition signal propagation direction can be set as desired. In comparison with fluid level and fluid quality sensors known from the prior art, this provides the advantage that, instead of two independent sound transducers which emit in only one direction, only a single sound transducer module is provided, the superimposition signal propagation direction of which can be set as desired. This makes it possible to dispense with separate deflecting elements for diverting sound.

Some embodiments include an apparatus for determining a level of a surface of a fluid and/or a quality of the fluid in a fluid container. The apparatus comprises a sound transducer module having at least two sound transducers which are each designed to emit sound signals in such a manner that a superimposition sound signal results when the at least two sound signals are superimposed, and a reference element which is arranged in the fluid, is at a predefined distance from the sound transducer module and is designed to reflect the superimposition sound signal. The sound transducer module is designed, by superimposing the at least two sound signals, to emit the superimposition sound signal both in a first direction to the surface of the fluid and in a second direction to the reference element, said second direction running at a predetermined sound signal angle with respect to the first direction. Consequently, the propagation direction of the superimposition sound signal can be set as desired by suitably controlling the sound transducer module.

In some embodiments, the sound transducer module is also designed to be controlled in at least two different control modes in such a manner that, in a first control mode, the superimposition sound signal is emitted in the first direction to the surface of the fluid and, in a second control mode, the superimposition sound signal is emitted in the second direction to the reference element. Therefore, both the level of the surface of the fluid and the quality of the fluid can be determined using only one sound transducer module, even in the case of low filling levels of the fluid, since the superimposition sound signal can be emitted in the desired direction, namely in the first direction or in the second direction. The superimposition sound signal can also be emitted in any direction between the first direction and the second direction.

In some embodiments, the at least two different control modes are carried out with a time delay with respect to one another. The different control modes may differ in terms of the control of the at least two sound transducers with regard to the amplitude, the frequency and/or the phase offset between the at least two sound signals.

In some embodiments, the predetermined sound signal angle between the first direction and the second direction is in a range between approximately 70° and approximately 110°, in a range between 80° and approximately 100°, and/or in a range between approximately 85° and approximately 95°, wherein the predetermined sound signal angle may be approximately 90°. The second direction may run substantially parallel to the base section of the fluid container, that is to say in a substantially horizontal direction, so that the superimposition sound signal can be emitted to the reference element, which may be arranged on the base section, and can be reflected there even in the case of low filling levels.

In some embodiments, the at least two sound transducers are arranged in a common plane in the form of a matrix. In this case, the plane is inclined by a predetermined tilt angle relative to the surface of the fluid, which tilt angle may be in a range between approximately 25° and approximately 56°, in a range between approximately 35° and approximately 55°, in a range between approximately 40° and approximately 50°, and/or approximately 45°. The at least two sound transducers arranged in a matrix may be arranged in such a manner that the respective transmission points of the sound signals are in a common plane.

In some embodiments, the at least two sound transducers are arranged at a predetermined distance from one another. This predetermined distance may be approximately an odd integer multiple ($2n-1$; n=natural number) of half the wavelength of the sound signals emitted by the at least two sound transducers.

In some embodiments, at least one of the at least two sound transducers is assigned a sound guiding element which is designed to at least partially guide the sound signals from the assigned sound transducer. The sound guiding element may be substantially funnel-shaped, in which the smaller opening faces the sound transducer.

In some embodiments, the apparatus also has a control unit which is designed to determine a sound speed inside the fluid on the basis of the superimposition sound signal which is emitted to the reference element, reflected at the reference element and received again and to determine the level of the fluid surface above the base section of the fluid container and/or the quality of the fluid on the basis of the superimposition sound signal which is emitted to the fluid surface, reflected at the fluid surface and received again and the determined sound speed inside the fluid. For example, the sound speed of the existing fluid may already provide an indication of its composition, in particular in the case of urea solutions for an exhaust gas after-treatment apparatus, for example SCR catalytic converters.

In some embodiments, the at least two sound transducers are capacitive micromechanical ultrasonic transducers (CMUT) or piezoelectric micromechanical ultrasonic transducers (PMUT).

Within the scope of the present disclosure, the term "fluid quality" describes a parameter characterizing a fluid. For example, the sound speed of the fluid, the density of the fluid, from which the chemical composition of the fluid can be derived, and the electrical properties of the fluid can be interpreted as parameters which characterize the fluid quality. For example, in the case of an aqueous urea solution, for example urea, the proportion of urea in the water can be estimated by determining the density of the aqueous urea solution. Elements of the same design or function are provided with the same reference signs across all figures.

FIG. 1 shows a fluid container 1 having a base section 3 and a fluid space 5 which is filled with a fluid F. The fluid F is, for example, a liquid medium for reducing pollutants in exhaust gases which has a reducing agent and/or a reducing agent precursor, for example an aqueous urea solution. In some embodiments, the fluid F may be an oil, for example a transmission oil for a transmission of a vehicle.

In order to determine a level H of a fluid surface O in the fluid container 1, a sound transducer module 10 is arranged on the base section 3 of the fluid container 1. In some embodiments, the sound transducer module 10 is arranged at a predetermined tilt angle α relative to the fluid surface O. For example, the base section may have, for this purpose, a corresponding recess 4 in which the sound transducer module 10 is fitted to the fluid container 1 from the outside. The sound transducer module 10 is connected to a control unit 2 which is designed to control the sound transducer module 10 and to evaluate the signals received from the sound transducer module in order to determine the level H of the fluid surface O and/or the quality of the fluid F.

In this case, the level H of the fluid surface O is defined as a distance between the fluid surface O and the base section 3, measured in a neutral position of the fluid container 1, that is to say if there is no inclined position of the fluid container 1 and the fluid surface O is substantially parallel to the base section 3. The level H of the fluid surface O can also be referred to as a filling level of the fluid container with fluid F.

In some embodiments, the sound transducer module 10 is coupled by a housing wall of the fluid container 1. For example, the housing wall is formed from a plastic, for example from so-called high-density polyethylene (HDPE), with the result that the base section 3 can be welded in the housing wall. In some embodiments, the sound transducer module 10 is adhesively bonded to the housing wall or mechanically pressed against the latter, possibly also with a further intermediate layer in order to compensate for unevennesses or roughnesses.

The sound transducer module 10 comprises at least two sound transducers 20 to 90 (see FIG. 2) which are each designed to emit and receive sound signals. The sound transducer 10 may be designed, by means of different control, to emit a superimposition sound signal, which results from superimposing the sound signals from the at least two sound transducers 20 to 90 (see FIG. 2), and to receive said signal again. For example, the superimposition sound signals emitted by the sound transducer module 10 are indicated with arrows 12, 14 in FIG. 1, whereas the superimposition sound signals received by the sound transducer module 10 again are indicated by arrows 11, 13.

A reference element 8 is also provided in the fluid F and may be formed from a material having a metal. The reference element 8 reflects at least one part of the superimposition sound signal 14 and is at a predetermined and constant distance from the sound transducer module 10. As shown in FIG. 1, the reference element 8 inside the fluid container 1 may be mechanically coupled to the base section 3.

The level H of the fluid surface O and/or the quality of the fluid is/are determined, as described in detail in the prior art, by evaluating the superimposition sound signal 12 which is emitted to the fluid surface O, is reflected at the fluid surface O and is received again and by evaluating the superimposition signal 14 which is emitted to the reference element 8, is reflected at the reference element 8 and is received again and on the basis of which the sound speed in the fluid F can be determined.

In some embodiments, the sound transducer module 10 consisting of at least two sound transducers 20 to 90, each of which respectively emits individual sound signals which run in a substantially parallel and are at least partially superimposed in such a manner that the result is a superimposition sound signal, the propagation direction of which can be set as desired by suitably controlling the at least two sound transducers 20 to 90.

Figure 2:
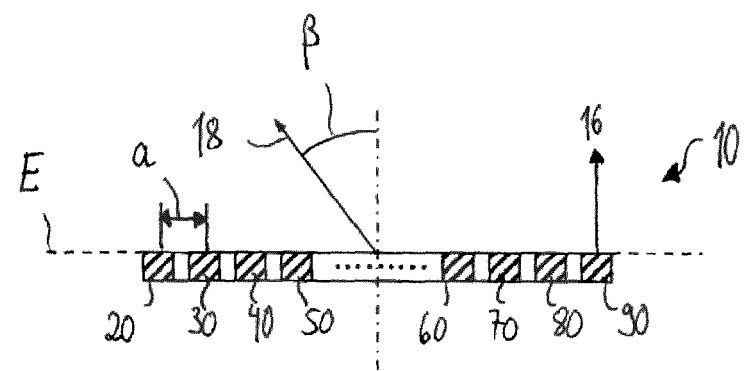
FIG. 2 shows a sectional view through a sound transducer module of the apparatus from FIG. 1.

FIG. 2 shows a section through the exemplary sound transducer 10 from FIG. 1. It can be gathered from FIG. 2 that the sound transducer module 10 can consist of a plurality of sound transducers 20 to 90, wherein further sound transducers can also be arranged in the direction into the plane of the drawing and out of the plane of the drawing. For example, the sound transducer module 10 has a matrix-like arrangement of a plurality of sound transducers which may each be the same. Alternatively, any further embodiments of the plurality of sound transducers are also conceivable, for example a circular arrangement or an unsorted arrangement.

The sound transducers 20 to 90 are arranged in a common plane E (illustrated with a dashed line in FIG. 2). In particular, the individual transmission points of the plurality of sound transducers 20 to 90 are in the common plane E. In some embodiments, the individual transmission points may not be arranged in a common plane, with the result that a superimposition sound signal 18 (see FIG. 2) is already generated when the plurality of sound transducers 20 to 90 are controlled at the same time and in an identical manner, which superimposition sound signal is not parallel to the arrow 16.

Furthermore, as shown in FIG. 2, the sound transducers 20 to 90 each have a predetermined distance a. The predetermined distance a between two adjacent sound transducers 20 to 90 is preferably approximately an odd integer (n) multiple of half the wavelength λ of the sound signals emitted by the sound transducers, that is to say $$a = (2 \cdot n - 1) \cdot \lambda$$

In this case, the predetermined distance a is measured from the fictitious transmission point of a sound transducer to the fictitious transmission point of an adjacent sound transducer. Each sound transducer 20 to 90 in FIG. 2 is substantially identical and may be provided in the form of a capacitive micromechanical sound transducer (CMUT) or piezoelectric micromechanical sound transducer (PMUT). Each sound transducer 20 to 90 emits a sound signal which runs substantially perpendicular to the plane of the arrangement (illustrated by way of example with the arrow 16 in FIG. 2). In some embodiments, each sound transducer 20 to 50 emits sound signals which are substantially identical with respect to the frequency and amplitude. The sound transducers 20 to 90 are controlled separately in this case, wherein the phase offset of the plurality of sound signals can be set by controlling the sound transducers 20 to 90 with a time delay, as a result of which the direction of the superimposition sound signal 12, 14 can be set.

In some embodiments, the sound transducers 20 to 90 may be different and may emit their sound signal in different directions in each case. In some embodiments, however, the plurality of sound transducers 20 to 90 are designed to each emit a sound signal in such a manner that the plurality of sound signals are at least partially superimposed in order to generate the superimposition sound signal 18 (see FIG. 2).

In configurations in which the sound transducer module 10 is arranged inside the fluid container 1, for example fitted to the base section 3 of the fluid container 1 from the inside, it may be advantageous for a sound guiding element to be assigned to each of the plurality of sound transducers 20 to 90, which sound guiding element is respectively designed to at least partially guide the respective sound signal from the assigned sound transducer 20 to 90. In particular, the respective sound guiding element may be funnel-shaped, wherein the smaller opening is assigned to the respective sound transducer 20 to 90. In some embodiments, the sound guiding element is cylindrical or has any other suitable shape.

The control unit 2 of the apparatus may control the plurality of sound transducers in such a manner that, when the plurality of individual sound signals from the sound transducers 20 to 90 are superimposed, a superimposition sound signal is generated and runs in a predetermined and desired direction. In FIG. 2, the arrow 18 represents, by way of example, the profile of the superimposition sound signal which runs at a predetermined angle β in comparison with the sound signal from an individual sound transducer 20 to 90.

In this case, the control unit 2 is designed to control the sound transducer module 10 in different control modes. That is to say, the individual control of the plurality of sound transducers 20 to 90 differs with regard to the amplitude, the frequency and/or the phase offset between the at least plurality of sound signals. For example, the plurality of sound transducers may be controlled with different strengths at different times.

Referring again to FIG. 1, the text below briefly explains how the apparatus for determining the level H of the fluid surface O of the fluid F and/or the quality of the fluid F can be operated. The fluid space 5 above the fluid F is filled with a further medium, for example air, with the result that the superimposition sound signal 12 emitted to the fluid surface O first of all by the sound transducer module 10 can be reflected at a transition of the fluid surface O to the air and can pass back to the sound transducer module 10 again (see arrow 11 in FIG. 1). The emission of the superimposition sound signal 12, 11 in the direction of the fluid surface O is carried out in a first control mode of the sound transducer module 10.

In some embodiments, the sound transducer module 10 is used both as a transmitter and as a receiver. The superimposition sound signal 12, 11 propagates directly, with the result that a power drop at obstacles is prevented and it is thus possible to determine high filling levels of the fluid container 1.

In order to precisely determine the level H of the fluid surface O in the fluid container 1, a signal propagation speed of the superimposition sound signals 11, 12, 13, 14 must be known. A reference measurement is carried out for this reason. In order to be able to carry out this reference measurement even in the case of low levels H of the fluid surface O in the fluid container 1, that is to say in the case of filling levels below 10% of a maximum filling level for example, a second control mode of the sound transducer module 10 is carried out in such a manner that the superimposition sound signal 14 is emitted close to the base section 3 of the fluid container 1 substantially parallel to the base section 3 in the direction of the reference element 8. The superimposition sound signal 13 reflected at the reference element 8 is then received by the sound transducer module again.

The reference element 8 is at a predefined distance from the sound transducer module 10. A propagation time difference of the emitted and reflected superimposition sound signal 13, 14 is determined by means of the control unit 2 on the basis of the known distance of the reference element 8 and a sound speed in the fluid F in the fluid container 1 is determined on the basis of the propagation time difference.

On the basis of the determined sound speed, the level H can then be determined by evaluating the propagation time of the superimposition sound signal 12, 11 emitted to the fluid surface O and received again. In some embodiments, the quality of the fluid F can be determined on the basis of the sound speed. Different sound speeds result depending on the composition of the fluid F.

The angle between the superimposition sound signal 12 and the superimposition sound signal 14 may be up to 110°, for example. In some embodiments, as an alternative to the configuration shown in FIG. 1, the tilt angle ∝ may be approximately 0°, that is to say the plane E runs substantially parallel to the base section 3. In such a configuration, the reference element 8 may not be arranged on the base section 3, but rather in the fluid container 1, and can be irradiated by the sound transducer module 10 by means of the superimposition sound signal 14.

In the configuration illustrated in FIG. 1, as already described above, the sound transducer module 10 is fitted to the base section 3 of the fluid container 1 from the outside. In particular, an elastic layer (not shown in the drawings) is situated between the sound transducer module 10 and the wall of the base section 3 of the fluid container 1 and is designed to fasten the sound transducer module 10 to the fluid container 1 and to exclude an air gap in the sound guiding path of the sound signals. Consequently, the sound transducer module 10 is designed to inject the superimposition sound signal into the fluid through the elastic layer and the wall of the base section 3 of the fluid container 1 and to receive it again. In this case, phase jumps and deflections, so-called Bragg angles, occur at the boundary surfaces between the different media (that is to say between the elastic layer and the wall of the base section 3 and between the wall of the base section 3 and the fluid F) and may be temperature-dependent, in particular in the case of the elastic layer.

Consequently, the control unit 2 is designed to control the sound transducer module 10 in such a manner that the superimposition sound signal is injected into the fluid in such a manner that the desired superimposition sound signal direction results. For this purpose, it may be advantageous to consider the temperature of the fluid which may provide a good estimate for the temperature of the elastic layer.

What is claimed is:

1. An apparatus for determining a level of a surface of a fluid or a quality of the fluid in a fluid container, the apparatus comprising:
   a sound transducer module with two sound transducers to receive and emit sound signals; and
   a reference element arranged in the fluid a predefined distance from at least one of the two sound transducers to reflect sound signals;
   wherein the sound transducer module emits respective sound signals from the two sound transducers in a manner forming a superimposition sound signal traveling both toward the surface of the fluid and toward the reference element;
   wherein a first angle between a surface of the sound transducer module and the surface of the fluid is at a predetermined sound signal angle with respect to an angle between the surface of the sound transducer module and the reference element.

2. The apparatus as claimed in claim 1, wherein:
   the sound transducer module has two different control modes;
   in a first control mode, the two sound transducers combine to emit the superimposition sound signal at the first angle; and
   in a second control mode, the two sound transducers combine to emit the superimposition sound signal at the second angle.

3. The apparatus as claimed in claim 2, wherein the two control modes have different parameters with regard to at least one of: an amplitude, a frequency, and/or a phase offset between the two sound signals.

4. The apparatus as claimed in claim 1, wherein the predetermined sound signal angle is in a range between approximately 70° and approximately 110°.

5. The apparatus as claimed in claim 1, wherein:
   the two sound transducers are arranged in a common plane in the form of a matrix;
   the plane is inclined by a tilt angle relative to the surface of the fluid, in a range between approximately 25° and approximately 65°.

6. The apparatus as claimed in claim 1, wherein the two sound transducers are arranged at a distance from one another approximately an odd integer multiple of half the wavelength of the sound signals emitted by the two sound transducers.

7. The apparatus as claimed in claim 1, further comprising:
   a control unit to determine a sound speed inside the fluid on the basis of the superimposition sound signal emitted toward the reference element and the level of the fluid surface above a base section of the fluid container and/or the quality of the fluid on the basis of the superimposition sound signal emitted toward the fluid surface and the determined sound speed inside the fluid.

8. The apparatus as claimed in claim 1, wherein the two sound transducers both comprise capacitive micromechanical ultrasonic transducers or piezoelectric micromechanical ultrasonic transducers.

\* \* \* \* \*